(No Model.)
R. F. O'MEARA.
HOSE COUPLING.
No. 515,788. Patented Mar. 6, 1894.
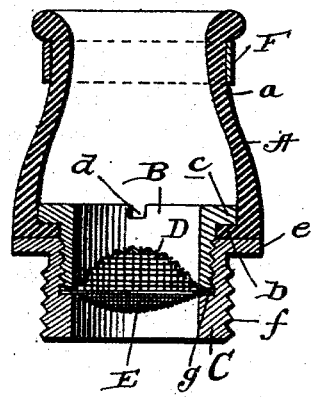
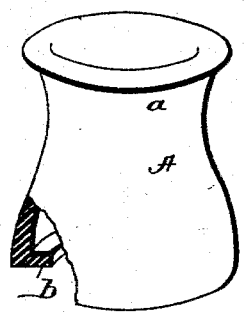
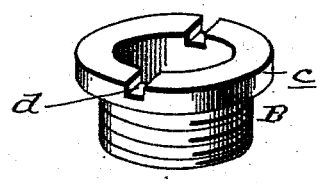
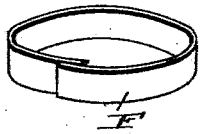
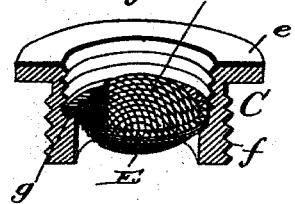
Witnesses:
Inventor
R. F. O'Meara
By James Shuhy
Attorney

UNITED STATES PATENT OFFICE.

ROGER F. O'MEARA, OF CINCINNATI, OHIO.

HOSE-COUPLING.

SPECIFICATION forming part of Letters Patent No. 515,788, dated March 6, 1894.

Application filed July 17, 1893. Serial No. 480,703. (No model.)

*To all whom it may concern:*

Be it known that I, ROGER F. O'MEARA, a citizen of the United States, residing at Cincinnati, in the county of Hamilton and State of Ohio, have invented certain new and useful Improvements in Hose-Couplers; and I do declare the following to be a full, clear, and exact description of the invention, such as will enable others skilled in the art to which it appertains to make and use the same.

My invention relates to improvements in hose couplers; and it has for its general object to provide a coupler of an exceedingly cheap and simple construction and one which is adapted to be readily secured upon faucets such as at present in use, and which is also adapted to serve as a filter and also to prevent the objectionable splashing of water in the sink, so often experienced.

With the foregoing ends in view the invention will be fully understood from the following description and claim when taken in connection with the accompanying drawings, in which—

Figure 1, is a diametrical section of my improved coupler complete. Fig. 2, is a perspective view partly in section of the rubber body section. Fig. 3, is a perspective view of the bushing or sleeve removed from the body. Fig. 4, is a perspective sectional view of the filter-carrying thimble, and Fig. 5, is a perspective view of the spring clamp.

Referring by letter to said drawings:—A, indicates the body section of my improved coupler. This body section A, is formed in one piece of rubber or equivalent elastic material and it has its upper portion contracted as shown at $a$, so as to tightly embrace a faucet, while its lower end is of an increased thickness and diameter and is provided with an inwardly extending flange $b$, for the engagement of the collar $c$, of the bushing or sleeve B, as shown. The said bushing or sleeve B, is preferably formed from metal, and it is exteriorly threaded for the engagement of the thimble or nipple C, and is provided in its inner end at diametrically opposite points with notches $d$, which are designed for the engagement of a screw driver or other implement through the medium of which it may be turned so as to disconnect it from the thimble or nipple.

The thimble or nipple C, is provided with a collar flange $e$, to bear against the body A, and with exterior threads $f$, for the engagement of a hose swivel, and it has the lower portion of its bore reduced in diameter so as to afford a shoulder rest $g$, for the filtering and splash preventing diaphragms D. E. These diaphragms are of a concavo-convex form and are made from wire gauze, and they are so arranged, as better illustrated in Fig. 1, that the convex side of the diaphragm D, will be uppermost while that of the diaphragm E, is down. By reference to the said Fig. 1, it will also be seen that the meshes of the uppermost diaphragm D, are materially larger than those of the diaphragm E, and by reason of this and the peculiar arrangement of the diaphragms, it will be noticed that not only will the water be filtered *en route* through the coupler but the force of the water will be broken and it will be caused to fall in a smooth and steady stream and will not splash and wet the floor about a sink, which is an important advantage, as is obvious.

F, indicates the spring clamp for clasping the body section A, upon a faucet so as to prevent a casual disconnection of the same. This spring clamp F, is formed from a single piece of spring steel or other suitable material, bent into a circular form, and it has its ends lapped as shown in Fig. 5, whereby it may be spread by the hand to permit of a ready placement of the body A, upon a faucet. In practice the clamp F, surrounds the contracted portion of the body A, beneath the collar flange $m$, thereof as shown in Fig. 1, and it serves, when the body is placed upon a faucet, to securely hold the same in position. By the provision of the collar flange $m$, at the upper end or the body A, it will be perceived that said body is prevented from slipping or working from under the spring clamp F, and said clamp is thereby enabled to securely hold the body upon the faucet.

It will be noticed from the foregoing description taken in connection with the drawings that my improved coupler is very simple and inexpensive; that it is efficient for the purposes stated, and that it may be readily placed upon and removed from the faucet and may be quickly and easily taken apart when it is necessary to clean the diaphragms or other parts.

Having described my invention, what I claim is—

A hose coupling comprising a body section formed from rubber and having its upper portion contracted and its lower portion enlarged and provided with an inwardly extending flange, a clamp for securing said body section upon a faucet, the exteriorly-threaded bushing or sleeve B, having a collar flange to engage the flange of the body section and also having notches $d$, in its inner end, the thimble or nipple E, having interior threads for the engagement of the sleeve or bushing B, and also having a shoulder rest as $g$, at the inner end of the threads, the concavo-convex diaphragm D, supported by said shoulder rest and having its convex side uppermost, and the concavo-convex gauze diaphragm E, also supported by the shoulder rest and having its concave side uppermost, substantially as and for the purpose set forth.

In testimony whereof I affix my signature in presence of two witnesses.

ROGER F. O'MEARA.

Witnesses:
JOSEPH O'MEARA,
MICHAEL O'MEARA.